(12) United States Patent
White, III et al.

(10) Patent No.: US 12,281,575 B2
(45) Date of Patent: *Apr. 22, 2025

(54) CERAMIC COMPONENT HAVING SILICON LAYER AND BARRIER LAYER

(71) Applicant: RTX CORPORATION, Farmington, CT (US)

(72) Inventors: Robert A. White, III, Meriden, CT (US); Brian T. Hazel, Avon, CT (US); Zhongfen Ding, South Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,483

(22) Filed: Jan. 20, 2023

(65) Prior Publication Data

US 2024/0247594 A1    Jul. 25, 2024

(51) Int. Cl.
*F01D 11/00* (2006.01)
*C04B 41/50* (2006.01)
*C04B 41/89* (2006.01)

(52) U.S. Cl.
CPC .......... *F01D 11/00* (2013.01); *C04B 41/5096* (2013.01); *C04B 41/89* (2013.01);
(Continued)

(58) Field of Classification Search
CPC ........ F01D 11/005; F01D 11/08; F01D 11/12; F01D 11/122; F01D 11/125;
(Continued)

(56) References Cited

U.S. PATENT DOCUMENTS 5,439,348 A    8/1995  Hughes et al.
6,335,105 B1   1/2002  McKee
(Continued)

FOREIGN PATENT DOCUMENTS

EP    3135866 A1    3/2017
EP    4119774 A1    1/2023
(Continued)

OTHER PUBLICATIONS

Extended European Search Report for Application No. EP 23214100 dated May 21, 2024.

*Primary Examiner* — Topaz L. Elliott
(74) *Attorney, Agent, or Firm* — Carlson, Gaskey & Olds, P.C.

(57) ABSTRACT

A seal system a ceramic component having a surface region defining a first surface roughness, a metallic component situated adjacent the surface region, and a coating system disposed on the surface region. The coating system includes a silicon-containing layer on the surface region and a barrier layer on the silicon-containing layer. The silicon-containing layer has a surface in contact with the barrier layer. The barrier layer has a surface in contact with the metallic component. The surface of the barrier layer has a second surface roughness that is less than the first surface roughness. The barrier layer limits interaction between silicon of the silicon-containing layer and elements of the metallic component. The barrier layer has a coefficient of thermal expansion that is within about 60% of a coefficient of thermal expansion of the ceramic component. A gas turbine engine and a method are also disclosed.

19 Claims, 2 Drawing Sheets

(52) U.S. Cl.
CPC ........ *F01D 11/005* (2013.01); *F05D 2220/32* (2013.01); *F05D 2300/2261* (2013.01); *F05D 2300/50211* (2013.01); *F05D 2300/516* (2013.01); *F05D 2300/6033* (2013.01); *F05D 2300/611* (2013.01)

(58) Field of Classification Search
CPC ................ C04B 41/5096; C04B 41/89; F05D 2300/2261; F05D 2300/611
See application file for complete search history.

(56) References Cited

U.S. PATENT DOCUMENTS

| | | | |
|---|---|---|---|
| 6,418,618 B1 | 7/2002 | Burdgick | |
| 6,517,960 B1 | 2/2003 | Wang | |
| 7,138,183 B2 | 11/2006 | Hisamatsu et al. | |
| 8,124,252 B2* | 2/2012 | Cybulsky | C23C 30/00 428/701 |
| 9,598,777 B2 | 3/2017 | Lee | |
| 9,920,656 B2 | 3/2018 | Landwehr et al. | |
| 10,024,175 B2 | 7/2018 | Varney | |
| 10,100,656 B2 | 10/2018 | Bancheri et al. | |
| 10,280,770 B2 | 5/2019 | Shim et al. | |
| 10,294,802 B2 | 5/2019 | Shi et al. | |
| 10,329,205 B2* | 6/2019 | Landwehr | C23C 4/134 |
| 10,401,028 B2 | 9/2019 | Freeman et al. | |
| 10,458,653 B2 | 10/2019 | Freeman et al. | |
| 10,435,534 B2 | 11/2019 | Pitolaj et al. | |
| 10,472,976 B2 | 11/2019 | Freeman et al. | |
| 10,717,678 B2 | 7/2020 | Lee | |
| 10,724,399 B2* | 7/2020 | Carlin | C04B 41/89 |
| 10,934,873 B2 | 3/2021 | Sarawate et al. | |
| 11,143,040 B2 | 10/2021 | McCaffrey et al. | |
| 11,466,585 B2 | 10/2022 | Arbona et al. | |
| 11,555,452 B1* | 1/2023 | Hazel | F16J 15/102 |
| 11,724,969 B2* | 8/2023 | Hafner | F01D 5/284 416/241 B |
| 11,781,486 B2* | 10/2023 | Hazel | C04B 37/025 415/170.1 |
| 2006/0110609 A1* | 5/2006 | Eaton | C23C 30/00 428/701 |
| 2006/0188736 A1* | 8/2006 | Luthra | C04B 41/4527 428/472 |
| 2007/0065672 A1* | 3/2007 | Bhatia | C23C 30/00 427/372.2 |
| 2007/0128447 A1* | 6/2007 | Hazel | C23C 26/00 427/372.2 |
| 2010/0255260 A1* | 10/2010 | Lee | C04B 41/52 428/164 |
| 2014/0272344 A1* | 9/2014 | Wan | C04B 41/009 427/419.7 |
| 2016/0017749 A1 | 1/2016 | Luthra et al. | |
| 2016/0145159 A1* | 5/2016 | Landwehr | C23C 28/042 427/249.2 |
| 2016/0214907 A1* | 7/2016 | Shim | C04B 35/573 |
| 2017/0030211 A1* | 2/2017 | Marin | F01D 11/005 |
| 2017/0058686 A1* | 3/2017 | Bancheri | F16J 15/0887 |
| 2017/0298753 A1* | 10/2017 | O'Leary | F01D 25/005 |
| 2018/0371600 A1* | 12/2018 | Li | C04B 41/52 |
| 2019/0040761 A1* | 2/2019 | Carlin | F01D 25/007 |
| 2019/0153886 A1* | 5/2019 | Vetters | F01D 25/005 |
| 2020/0141276 A1 | 5/2020 | Wolfe et al. | |
| 2020/0149418 A1* | 5/2020 | Whittle | F01D 5/284 |
| 2020/0189985 A1* | 6/2020 | Hafner | C04B 41/5024 |
| 2021/0332709 A1* | 10/2021 | Liles | B28B 11/04 |
| 2022/0048828 A1* | 2/2022 | Liu | F01D 5/284 |
| 2022/0169574 A1 | 6/2022 | Shim et al. | |
| 2022/0356119 A1* | 11/2022 | Jackson | C04B 35/481 |
| 2022/0356120 A1* | 11/2022 | Jackson | C04B 41/5044 |
| 2023/0015977 A1 | 1/2023 | Hazel et al. | |
| 2023/0019497 A1* | 1/2023 | Surace | F02C 7/28 |
| 2023/0235705 A1* | 7/2023 | Hazel | F16J 15/121 415/170.1 |

FOREIGN PATENT DOCUMENTS

| | | |
|---|---|---|
| EP | 4276285 A1 | 11/2023 |
| FR | 3059323 A1 | 6/2018 |

\* cited by examiner

CERAMIC COMPONENT HAVING SILICON LAYER AND BARRIER LAYER

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature gas flow. The high-pressure and temperature gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in gas turbine engine systems.

SUMMARY

A seal system according to an exemplary embodiment of this disclosure, among other possible things includes a ceramic component having a surface region defining a first surface roughness, a metallic component situated adjacent the surface region, and a coating system disposed on the surface region. The coating system includes a silicon-containing layer on the surface region and a barrier layer on the silicon-containing layer. The silicon-containing layer has a surface in contact with the barrier layer. The barrier layer has a surface in contact with the metallic component. The surface of the barrier layer has a second surface roughness that is less than the first surface roughness. The barrier layer limits interaction between silicon of the silicon-containing layer and elements of the metallic component. The barrier layer has a coefficient of thermal expansion that is within about 60% of a coefficient of thermal expansion of the ceramic component.

In a further example of the foregoing, the coefficient of thermal expansion of the barrier layer is within about 40% of the coefficient of thermal expansion of the ceramic component.

In a further example of any of the foregoing, the metallic component is a nickel- or cobalt-based superalloy.

In a further example of any of the foregoing, the barrier layer includes at least one of rare earth silicates, alkali silicates alkaline earth silicates, alkaline earth aluminosilicates, mullite, silicon oxynitrides, silicon carbides, silicon oxycarbides, barium-magnesium aluminosilicate, hafnon, zircon, and combinations thereof.

In a further example of any of the foregoing, the barrier layer includes at least one mullite, hafnon, and zircon.

In a further example of any of the foregoing, the barrier layer includes strontium aluminosilicate (SAS) and barium-strontium aluminosilicate (BSAS).

In a further example of any of the foregoing, the barrier layer has a surface roughness less than about 200 Ra.

In a further example of any of the foregoing, the silicon-containing layer is silicon.

A gas turbine engine according to an exemplary embodiment of this disclosure, among other possible things includes a compressor section, a combustor in fluid communication with the compressor section, and a turbine section in fluid communication with the combustor and at least one sealing system in the turbine section or the combustor. The sealing system includes a ceramic component having a surface region defining a first surface roughness, a metallic component situated adjacent the surface region, and a coating system disposed on the surface region. The coating system includes a silicon-containing layer on the surface region and a barrier layer on the silicon-containing layer and in contact with the metallic component. The silicon-containing layer has a surface in contact with the barrier layer. The barrier layer has a surface in contact with the metallic component. The surface of the barrier layer has a second surface roughness that is less than the first surface roughness. The barrier layer limits interaction between silicon of the silicon-containing layer and elements of the metallic component. The barrier layer has a coefficient of thermal expansion that is within about 60% of a coefficient of thermal expansion of the ceramic component.

In a further example of the foregoing, the coefficient of thermal expansion of the barrier layer is within about 40% of the coefficient of thermal expansion of the ceramic component.

In a further example of any of the foregoing, the metallic component is a nickel- or cobalt-based superalloy.

In a further example of any of the foregoing, the barrier layer includes at least one of rare earth silicates, alkali silicates alkaline earth silicates, alkaline earth aluminosilicates, mullite, silicon oxynitrides, silicon carbides, silicon oxycarbides, barium-magnesium aluminosilicate, hafnon, zircon, and combinations thereof.

In a further example of any of the foregoing, the barrier layer includes at least one of mullite, hafnon, and zircon.

In a further example of any of the foregoing, the barrier layer includes strontium aluminosilicate (SAS).

In a further example of any of the foregoing, the barrier layer includes barium-strontium aluminosilicate (BSAS).

In a further example of any of the foregoing, the silicon-containing layer is silicon.

A method of minimizing interaction between components of a seal system according to an exemplary embodiment of this disclosure, among other possible things includes disposing a coating system on a surface region of a ceramic component. A metallic component is situated adjacent the surface region. The coating system includes a silicon-containing layer on the surface region and a barrier layer on the silicon-containing layer. The silicon-containing layer has a surface in contact with the barrier. The barrier layer has a surface in contact with the metallic component. The barrier layer limits interaction between silicon of the silicon-containing layer and elements of the metallic component. The barrier layer has a coefficient of thermal expansion that is within about 60% of a coefficient of thermal expansion of the ceramic component.

In a further example of the foregoing, the barrier layer includes at least one of rare earth silicates, alkali silicates alkaline earth silicates, alkaline earth aluminosilicates, mullite, silicon oxynitrides, silicon carbides, silicon oxycarbides, barium-magnesium aluminosilicate, hafnon, zircon, and combinations thereof.

In a further example of any of the foregoing, the barrier layer includes strontium aluminosilicate (SAS).

In a further example of any of the foregoing, the barrier layer includes barium-strontium aluminosilicate (BSAS).

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
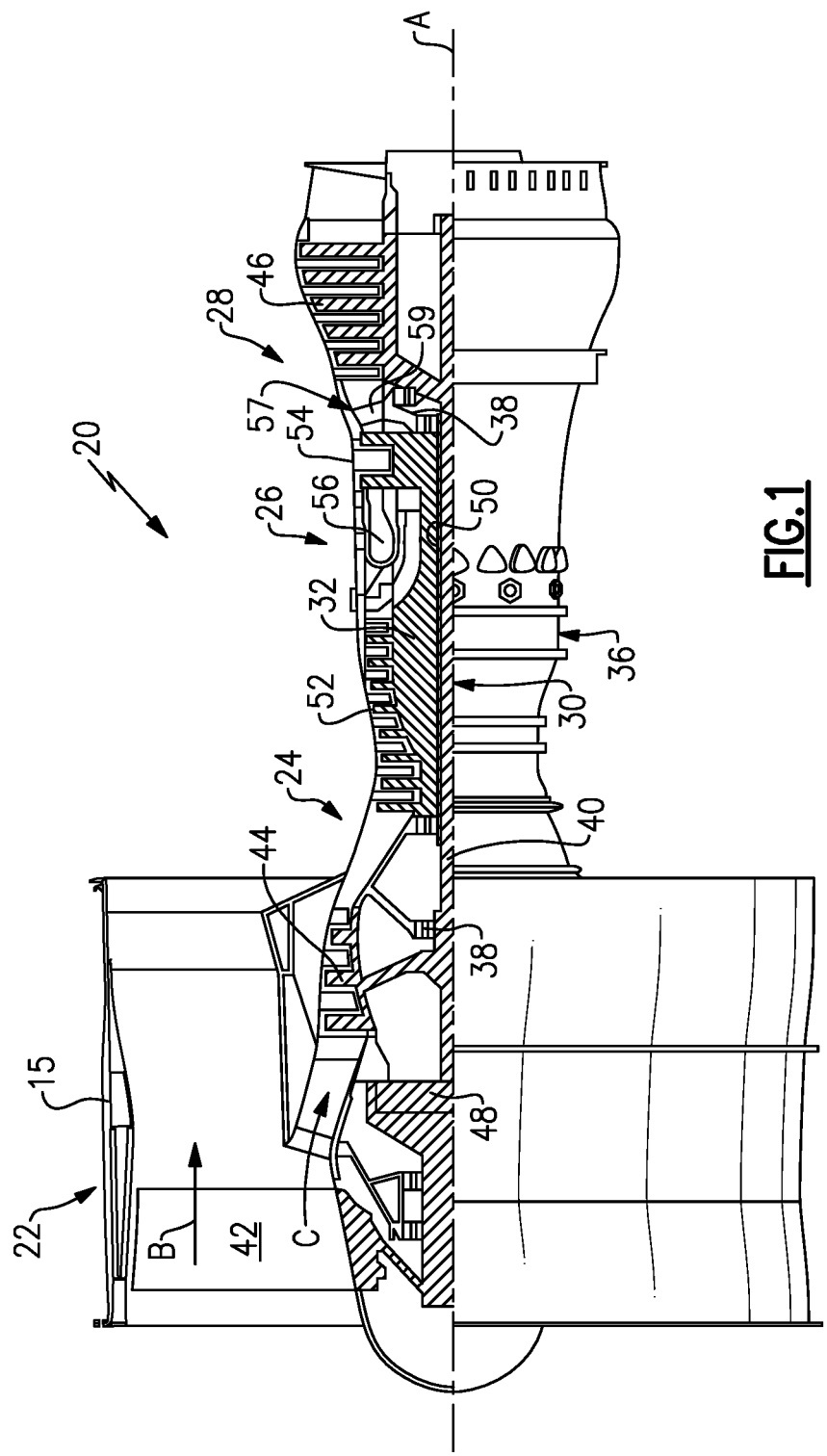
FIG. 1 an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2A:
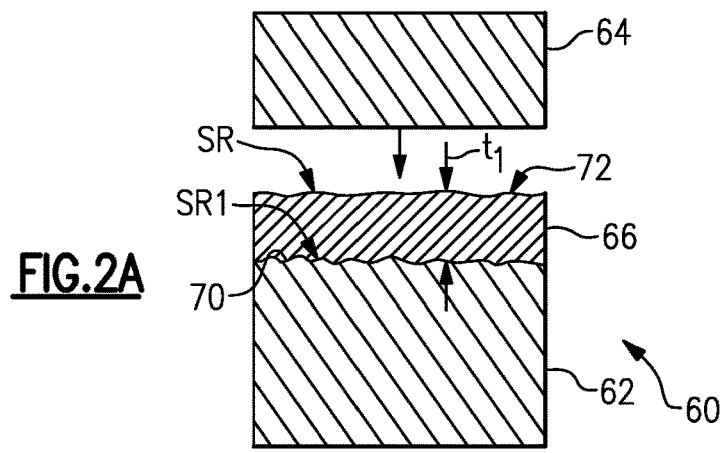
FIG. 2A illustrates portions of an example seal system.

FIG. 2A illustrates a sectioned view of a representative portion of a seal system 60 of the engine 20. As examples, the seal system 60 may be implemented in the turbine section 28 in association with a turbine vane, a turbine blade, or a blade outer air seal, or in other components in the engine 20 that are exposed to high temperatures, such as the combustor section 26. The seal system 60 includes a ceramic component 62 and a metallic component 64, which is formed of a superalloy such as a nickel- or cobalt-based superalloy. As will be appreciated, FIG. 2A is representative and the actual geometry of the components will vary depending on the particular implementation. In one example, the metallic component 64 is a feather seal, which is a thin, generally uniform thickness strip of metal. It is to be understood, however, that the metallic component 64 can alternatively be a component other than a feather seal, such as an adjacent component that serves other functions in addition to sealing.

The ceramic component 62 is formed of a monolithic ceramic, a ceramic matrix composite (CMC), or a combination of monolithic ceramic and CMC. The monolithic ceramic may be, but is not limited to, silicon nitride or silicon carbide. A CMC has ceramic fiber tows that are disposed in a ceramic matrix. The CMC may be, but is not limited to, a SiC/SiC CMC in which SiC fiber tows are disposed within a SiC matrix. A fiber tow is a bundle of filaments. As an example, a single tow may have several hundred filaments. The tows may be arranged in a fiber architecture, which refers to an ordered arrangement of the tows relative to one another, such as, but not limited to, 2D/3D woven, braided, knitted, or unwoven (e.g., unidirectional, matted, etc.) structures.

The ceramic component 62 includes a surface region 70, which is a surface area of the ceramic component 62 at which the CMC component 62 seals with the metallic component 64. Most typically, this will be on the backside of the ceramic component 62 rather than facing into in the core gaspath C of the engine 20. The surface region 70 defines a first surface roughness SR1. As used herein, surface roughness refers to surface roughness Ra (typically in microinches). Surface roughness Ra can be measured using known profilometer or structured light scan equipment and methods. For a CMC, although the fiber tows are embedded in the matrix, the matrix may not completely smooth over the fiber tows. As a result, in comparison to surfaces of metallic components, the surface of a CMC is relatively rough and "wavy" from crimping of the fiber tows and/or open porosity of the matrix. A monolithic ceramic may not be as rough or wavy as a CMC but still has a relatively rough surface in comparison to metallic components. This roughness, represented by the first surface roughness SR1, presents a challenge to sealing because a mating seal, e.g., the metallic component 64, does not conform to the surface roughness, thereby leaving small gaps that may provide pathways for leakage.

In this regard, as shown in FIG. 2A, a silicon-containing layer 66 is provided on the first surface region 70 and serves to fill-in the roughness and thereby somewhat smooth the CMC. In one example, the silicon-containing layer 66 is pure or substantially pure silicon. The silicon-containing layer 66 is deposited by known deposition techniques, such as but not limited to thermal spraying. The surface 72 of the silicon-containing layer 66 has a surface roughness SR that is less than the first surface roughness SR1. For example, the surface roughness SR1 is greater than about 800 Ra and the surface roughness SR is less than about 200 Ra. In a more particular example, the surface roughness SR is less than about 100 Ra. Thus, the silicon-containing layer 66 in essence serves to provide a reduction in roughness of at least 75%. Some roughness is desired in order to promote mechanical bonding with a later-applied barrier layer 68. In general, the silicon-containing layer 66 has a thickness t1 up to about 60 mils, such as 5 mils or 10 mils. The thickness t1 may be selected in accordance with the desired adherence with the ceramic component 62 as well as the total thickness of all coating layers in the region of sealing and flow path geometry.

While the top surface 72 of the silicon-containing layer 66 is somewhat smooth, if the metal of the metallic component 64 were to be in direct contact with silicon of the silicon-containing layer 66, the silicon may migrate and intermix with elements of the metallic component 64, such as nickel or cobalt, to form relatively low melting temperature eutectic phases. For instance, Ni—Si and Co—Si eutectic phases begin at around 965° C. and 1193° C., respectively. The melting temperatures of these eutectic phases are generally lower than the melting temperature of the superalloy of the metallic component 64. Therefore, eutectic formation may reduce thermal stability and durability.

Figure 2B:
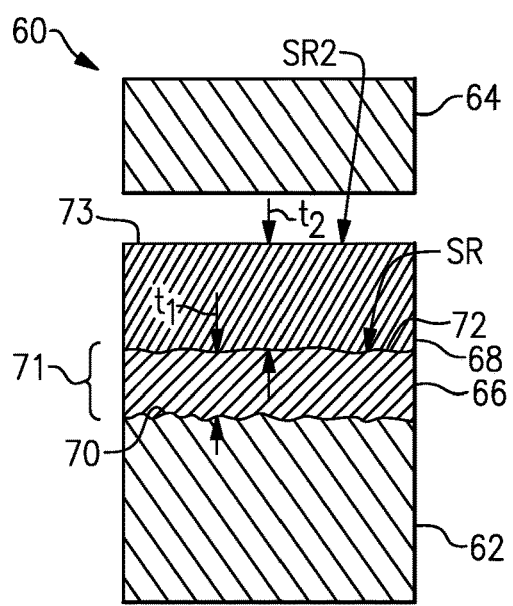
FIG. 2B illustrates an example seal system (in a non-sealed state) that has a silicon layer and a barrier layer.

In this regard, as shown in FIG. 2B a barrier layer 68 is provided on the silicon-containing layer 66 to limit or stop interaction between the silicon of the silicon containing layer 66 and the elements of the metallic component 64. The silicon-containing layer 66 and the barrier layer 68 are collectively considered to be a coating system 71. The silicon-containing layer 66 also serves as a bond coating for the overlying barrier layer 68. The silicon-containing layer 66 strongly bonds with the ceramic component 62 and thus makes for a compatible surface for adhering oxide coatings.

The barrier layer 68 properties depend on its composition and microstructure. The microstructure of the barrier layer 68 in turn depends on, among other things, the particle size in the coating material feedstock.

In general, the barrier layer 68 is selected to have good coefficient of thermal expansion (CTE) match with the ceramic component 62 to reduce spalling. However, the barrier layer 68 properties may be further tuned for certain applications. For instance, where the components 62/64 undergo bending during operation of the engine 20, the barrier layer 68 is selected to have high compressive and tensile strength, which is usually related to the microstructure of the coating. As another example, the anticipated operating temperature for the barrier layer 68, which is related to its particular location within the engine 20, will dictate the required glass transition temperature.

In a particular example, the CTE of the barrier layer 68 is within about 60% of the CTE of the ceramic component 62. In a further example, the CTE of the barrier layer 68 is within about 40% of the CTE of the ceramic component 62.

The barrier layer 68 may include rare earth silicates, alkali silicates alkaline earth silicates, alkaline earth aluminosilicates, yttria-stabilized zirconia, alumina-stabilized zirconia, mullite, titania, chromia, silicon oxynitrides, silicon carbides, silicon oxycarbides, barium-magnesium aluminosilicate, hafnium oxides such as hafnon, hafnium silicon oxides, alumina-stabilized zirconia, zirconium oxides such as zircon, yttrium oxides such as yttria, and combinations thereof. In a particular example, the barrier layer 68 includes a silicate. In a further example, the barrier layer 68 includes strontium aluminosilicate (SAS) or barium-strontium aluminosilicate (BSAS).

Figure 2C:
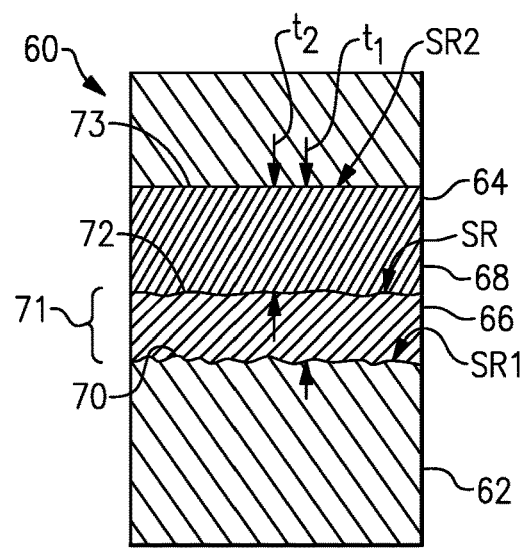
FIG. 2C illustrates the seal system of FIG. 2B but in a sealed state.

In deposition of the barrier layer 68 onto the ceramic component 62, the surface 72 of the silicon-containing layer 66 serves as a template to apply the barrier layer 68. Surface 73 of barrier layer 68 is machined and/or polished, such as by milling, grinding, or ultrasonic impact machining, to desired surface roughness SR2, as long as the machining/polishing does not expose the underlying silicon. As an example, the barrier layer 68 has a thickness t2 of about 10 mils to about 110 mils before machining/polishing, which leaves a sufficient thickness of material that can be removed in order to achieve a desired surface roughness SR2 and also meet dimensional requirements of the part geometry. FIG. 2B illustrates the system 60 prior to sealing between the metallic component 64 and the ceramic component 62, and FIG. 2C illustrates the system 60 in a sealed state.

In one example, the barrier layer 68 is deposited by plasma spray or other known technique and is then machined to the final desired thickness t2 and surface roughness SR2. For example, the surface roughness SR2 is less than 100 Ra. In general, the final thickness t2 is more than the thickness t1 of the silicon-containing layer 66. The relatively thick barrier layer 68 in comparison to the silicon-containing layer 66 provides a means of reducing even extreme surface variation/roughness. Further the use of higher densities of the ceramic barrier is better for machinability.

Figure 3:
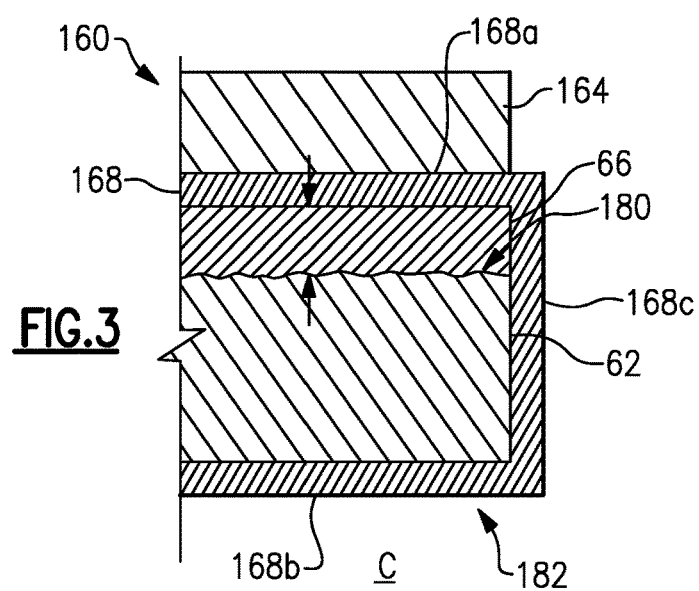
FIG. 3 illustrates another example seal system in which the barrier layer also serves as an environmental barrier.

FIG. 3 illustrates another example seal system 160. In this disclosure, like reference numerals designate like elements where appropriate and reference numerals with the addition of one-hundred or multiples thereof designate modified elements that are understood to incorporate the same features and benefits of the corresponding elements. The ceramic component 62 is situated such that it has a non-core-gaspath region 180 that faces away from core gaspath C and a core-gaspath region 182 that faces into and bounds the core gaspath C.

In this example, the barrier layer 168 includes a first section 168a on the silicon-containing layer 66, a second section 168b, and an intermediate section 168c that connects the first and second sections 168a/168b. The first section 168a serves as a barrier to silicon from the silicon-containing layer 66 interacting with the metallic component 164, as discussed above, but the barrier layer 168 also continuously extends around at least a portion of the ceramic component 62 such that the second section 168b serves as an environmental barrier layer at the core-gaspath region 182. The barrier layer 168 can have the same composition as the barrier layer 68 discussed above.

Silicon-based ceramic matrix composites ("CMC") or monolithic ceramics are desirable in high temperature components in the engine 20 due to their temperature capability and low density. Components such as CMC or monolithic ceramic vanes, blades, and blade outer air seals are segmented circumferentially, and typically multiple parts make up a given row. The intersegment or mate-face gaps between these parts must be sealed in order to reduce exposure of metallic hardware to hot gas-path air ingestion. In these regards, the seal systems here may be implemented pursuant to such purposes and to control leakage of secondary airflow, which may otherwise debit engine performance.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A seal system comprising:
   a ceramic component having a surface region defining a first surface roughness;
   a metallic component situated adjacent the surface region; and
   a coating system disposed on the surface region, the coating system including a silicon-containing layer and a barrier layer, the silicon-containing layer disposed on the surface region, the barrier layer extending continuously around the ceramic component and the silicon-containing layer, the barrier layer having a first section disposed between the metallic component and silicon-containing layer, a second section disposed on the ceramic component, and an intermediate section that connects the first section and the second section, the first section having a surface in contact with the metallic component, the surface of the first section having a second surface roughness that is less than the first surface roughness, the barrier layer limiting interaction between silicon of the silicon-containing layer and elements of the metallic component, and the barrier layer having a coefficient of thermal expansion that is within 60% of a coefficient of thermal expansion of the ceramic component,
   wherein the barrier layer includes at least one of hafnon and zircon.

2. The seal system of claim 1, wherein the coefficient of thermal expansion of the barrier layer is within 40% of the coefficient of thermal expansion of the ceramic component.

3. The seal system of claim 1, wherein the metallic component is a nickel- or cobalt-based superalloy.

4. The seal system of claim 1, wherein the barrier layer includes at least one of rare earth silicates, alkali silicates alkaline earth silicates, alkaline earth aluminosilicates, mullite, silicon oxynitrides, silicon carbides, silicon oxycarbides, barium-magnesium aluminosilicate, and combinations thereof.

5. The seal system of claim 4, wherein the barrier layer includes at least one of strontium aluminosilicate (SAS) and barium-strontium aluminosilicate (BSAS).

6. The seal system of claim 4, wherein the second surface roughness is less than 100 Ra.

7. The seal system of claim 1, wherein the silicon-containing layer is silicon.

8. The seal system of claim 1, wherein the ceramic component has a non-core-gaspath region that faces away from a core gaspath and a core-gaspath region that faces into and bounds the core gaspath.

9. The seal system of claim 1, wherein the barrier layer includes hafnon.

10. The seal system of claim 1, wherein the barrier layer includes zircon.

11. A gas turbine engine comprising:
    a compressor section;
    a combustor in fluid communication with the compressor section; and
    a turbine section in fluid communication with the combustor, and at least one sealing system in the turbine section or the combustor, the at least one sealing system including:
    a ceramic component having a surface region defining a first surface roughness,
    a metallic component situated adjacent the surface region, and
    a coating system disposed on the surface region, the coating system including a silicon-containing layer and a barrier layer, the silicon-containing layer disposed on the surface region, the barrier layer extending continuously around the ceramic component and the silicon-containing layer, the barrier layer having a first section disposed between the metallic component and silicon-containing layer, a second section disposed on the ceramic component, and an intermediate section that connects the first section and the second section, the first section having a surface in contact with the metallic component, the surface of the first section having a second surface roughness that is less than the first surface roughness, the barrier layer limiting interaction between silicon of the silicon-containing layer and elements of the metallic component, and the barrier layer having a coefficient of thermal expansion that is within 60% of a coefficient of thermal expansion of the ceramic component, wherein the barrier layer includes at least one of hafnon and zircon.

12. The gas turbine engine of claim 11, wherein the coefficient of thermal expansion of the barrier layer is within 40% of the coefficient of thermal expansion of the ceramic component.

13. The gas turbine engine of claim 11, wherein the metallic component is a nickel- or cobalt-based superalloy.

14. The gas turbine engine of claim 11, wherein the barrier layer includes at least one of rare earth silicates, alkali silicates alkaline earth silicates, alkaline earth aluminosilicates, mullite, silicon oxynitrides, silicon carbides, silicon oxycarbides, barium-magnesium aluminosilicate, and combinations thereof.

15. The gas turbine engine of claim 14, wherein the barrier layer includes strontium aluminosilicate (SAS).

16. The gas turbine engine of claim 14, wherein the barrier layer includes barium-strontium aluminosilicate (BSAS).

17. The gas turbine engine of claim 11, wherein the silicon-containing layer is silicon.

18. A method of minimizing interaction between components of a seal system, comprising:

disposing a coating system on a surface region of a ceramic component, the surface region defining a first surface roughness, wherein a metallic component is situated adjacent the surface region, and wherein the coating system includes a silicon-containing layer and a barrier layer the silicon-containing layer disposed on the surface region, the barrier layer extending continuously around the ceramic component and the silicon-containing layer, the barrier layer having a first section disposed between the metallic component and silicon-containing layer, a second section disposed on the ceramic component, and an intermediate section that connects the first section and the second section, the first section having a surface in contact with the metallic component, the surface of the first section having a second surface roughness that is less than the first surface roughness, the barrier layer limiting interaction between silicon of the silicon-containing layer and elements of the metallic component, and the barrier layer having a coefficient of thermal expansion that is within about 60% of a coefficient of thermal expansion of the ceramic component, wherein the barrier layer includes at least one of hafnon and zircon.

19. The method of claim 18, wherein the barrier layer includes at least one of rare earth silicates, alkali silicates alkaline earth silicates, alkaline earth aluminosilicates, mullite, silicon oxynitrides, silicon carbides, silicon oxycarbides, barium-magnesium aluminosilicate, and combinations thereof.

* * * * *